US005389341A

United States Patent [19]

Tuunanen et al.

[11] Patent Number: 5,389,341

[45] Date of Patent: Feb. 14, 1995

[54] KNOB PIPETTE

[75] Inventors: Jukka Tuunanen, Helsinki; Juhaa K. Telimaa, Vantaa; Antti J. Keipi, Vantaa; Ari K. Kukkonen, Vantaa, all of Finland

[73] Assignee: Labsystems Oy, Helsinki, Finland

[21] Appl. No.: 79,776

[22] Filed: Jun. 22, 1993

[30] Foreign Application Priority Data

Jun. 24, 1992 [FI] Finland .................................. 922939

[51] Int. Cl.[6] ........................... B01L 3/02; G01N 1/14

[52] U.S. Cl. .................................. 422/100; 73/864.13; 73/864.16; 73/864.18

[58] Field of Search .................. 422/100, 99; 436/180; 73/864.13, 864.16, 864.18

[56] References Cited

U.S. PATENT DOCUMENTS 3,810,391 5/1974 Suovaniemi ........................ 73/425.6
4,058,370 11/1977 Suovaniemi ........................... 23/259
4,399,711 8/1983 Klein .................................. 422/100
4,519,258 5/1985 Jakubowicz ...................... 73/864.16
4,905,526 3/1990 Magnussen ....................... 73/864.18
4,988,481 1/1991 Jarvimaki et al. .................. 422/100
5,002,737 3/1991 Tervamaki .......................... 422/100

FOREIGN PATENT DOCUMENTS 86969 7/1992 Finland .
87740 11/1992 Finland .
3136777 8/1982 Germany .
WO87/00085 1/1987 WIPO .

*Primary Examiner*—Donald E. Czaja
*Assistant Examiner*—Milton I. Cano
*Attorney, Agent, or Firm*—Armstrong, Westerman, Hattori, McLeland & Naughton

[57] ABSTRACT

A motor-driven knob pipette, wherein the displacement of a slidably transferable knob controls the movement of a piston by means of an electronic control system. The pipette is light to use, and the user has continuosly a good motory feel with the pipette.

14 Claims, 4 Drawing Sheets

KNOB PIPETTE

FIELD OF INVENTION

The invention relates to pipettes used in liquid dosing, which pipettes have a piston movable by pressing a knob.

PRIOR ART

In laboratories, pipettes are used for dosing liquids, which pipettes have a cylinder and therein a piston by means of which the liquid is sucked and discharged. The rod of the piston rod extends above the handle of the pipette into a knob, by means of which the piston is moved.

For example the patent publication FI-47461 (corresponds to the publication U.S. Pat. No. 3,810,391) describes a pipette of the above-mentioned type. Therein, the piston rod is also connected with a spring, which returns the rod (and thereby also the piston) to its upper position, unless the knob is pressed.

Pipettes in which the piston is moved by the power of an electric motor are also known. This naturally makes the use of the pipette lighter.

Electrically operated pipettes are known e.g. from the publications FI-55007 (corresponds e.g. to the publication U.S. Pat. No. 4,058,370), DE-3136777, WO-87/00085, U.S. Pat. No.4,519,258, U.S. Pat. No. 4,905,526 and FI-A-902267.

In known electrically operated pipettes, the operation of the motor and thereby also the piston movement are controlled by means of two-position switches.

GENERAL DESCRIPTION OF INVENTION

It has now been invented an electrically operated pipette, which has an electric motor moving a piston and in which the operation of the motor is controlled by means of a reciprocative, slidably movable knob, whose displacement determines the piston movement by means of a control system.

It has been observed that the invented solution has an advantage over conventional electrically operated pipettes such that the number of malfunctions and unnecessary safety precautions decreases. This is quite apparently due to the fact that the user has a better motory feel with the pipette operation.

The invention and its certain applications are defined in detail in the patent claims.

DETAILED DESCRIPTION OF INVENTION

In the drawings of the description:

Figure 1:
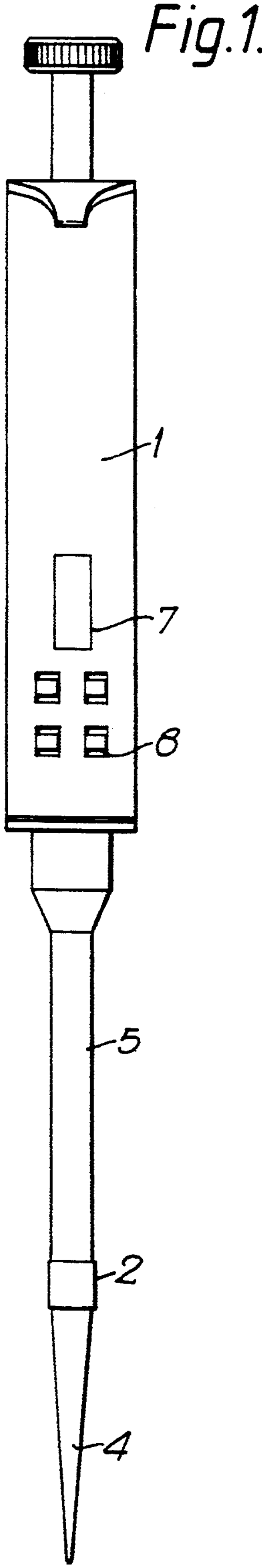
FIGS. 1 and 2 show a pipette from the front and from the side.

The main parts of the pipette include a body provided with an upper end and a lower end, a cylinder part at the lower end of the body, a piston reciprocating in the cylinder part for sucking and removing liquid, an electric motor and a transmission mechanism for moving the piston, a control system for controlling the piston movement, and a knob slidably and reciprocatively movable in the body, the displacement of which knob by means of the control system determines the piston movement.

The electric motor can be e.g. a stepping or DC motor.

The transmission mechanism can be based e.g. on a guide screw and nut or on a rack and pinion.

The knob has two extreme positions, between which it may be slid. The control is preferably arranged such that the knob has an upper position extending from the body and a lower position located more inside relative to the body, which positions also correspond to the upper and lower position of the piston. Most preferably, the knob is also connected with a return spring mechanism, which tends to keep the knob in its upper position. The knob is then basically of the same type as that used in pipettes operated manually, and its operating mechanism continually gives the user a concrete feeling of the pipetting.

Since the knob is not mechanically in a transmission relationship with the piston, the knob can be easily positioned in any place on the body, e.g. on the side of the body. The possibilities of the construction are thus increased. The knob may thus be moved by the forefinger in the cross-direction of the body. Most preferably, the piston has still beneath the lower position a discharge position, into which the piston is driven, when the liquid is dosed out of the pipette. This ensures a discharge of the liquid as completely as possible. Similarly, the knob has a discharge position beneath the lower position.

The knob is most preferably connected with a return spring for the discharge movement, which withstands the pressing of the knob below the lower position. In this way, the user may readily feel when the knob enters into the lower position.

The displacement of the knob is most preferably measured by a pulse sensor sensing the direction of movement, by a resistance sensor or an optic sensor. A capacitive or an inductive sensor can also be used. The information about the displacement is transmitted into the control system, which controls the piston movement in a desired manner.

The movement limits of the piston can be determined by means of movement limiters, such as stops, limit switches or braking devices, placed on the body or the transmission mechanism. The limiter in volume-controllable pipettes is adjustable, whereby the volume to be pipetted may be set as desired.

The pipette has most preferably a piston-movement monitoring system connected to the control system. The system can be based on e.g. a pulse encoder or a tachogenerator. The monitoring system enters into the control system an information about the distance travelled by the piston. On the basis of this information, the piston movement can be stopped precisely, when the piston is in the desired location. The piston movement is best stopped by decelerating the rotational speed of the motor. By means of the system, also the movement speed of the piston can be followed, if desired. Also the momentary speed of the piston and the difference between the displacement of the knob and the piston can be used as controlled variables in the control system.

The information of the control system about the piston movement can be registered as a function of time, whereby an information about the momentary speed of the piston is obtained. As control parameters can be used a ratio control, in which the displacement of the knob is compared with the distance travelled by the piston, and a derivational control, in which speed differences between the knob and the piston are compared. When the user of the pipette can also control the movement speed of the piston by means of the knob movement, he can also use different speeds for different liquids and different amounts of liquid.

In the best mode, the pipette further has a volume control mechanism, whereby also the volume set is taken as a controlled variable.

Most preferably, the pipette also includes an exchangable cylinder-piston module for different volume ranges. In this case, also the volume range can be used as a controlled variable.

Figure 2:
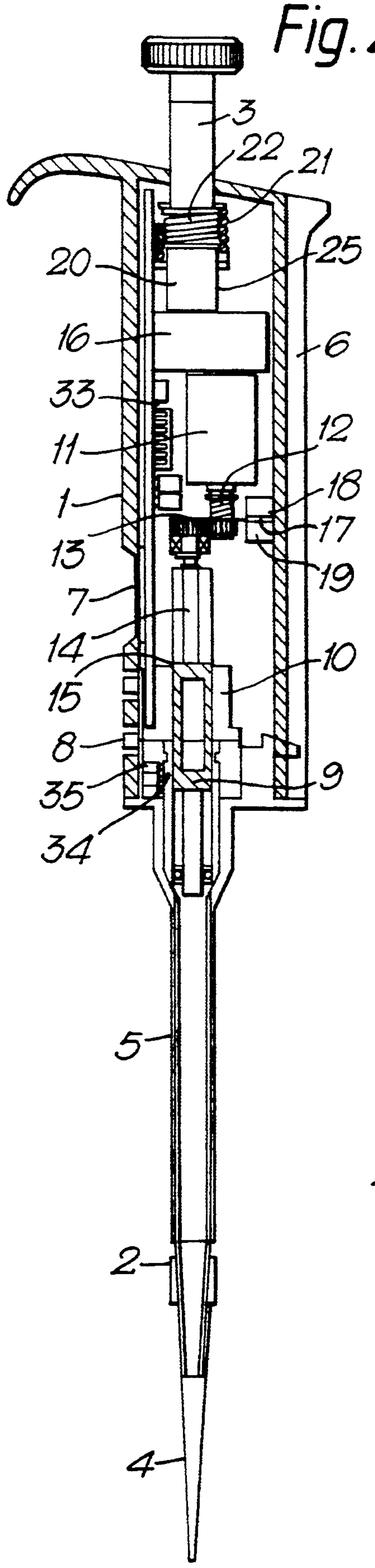

A pipette according to FIGS. 1 and 2 has a body 1 and at its lower end a cylinder part 2. At the upper end of the body there is a press knob 3. The upper part of the body forms a handle to be grasped with a palm grip.

An exchangable liquid jet container 4 is fixed to the lower end of the cylinder part 2.

On the cylinder part 2 there is a slidable loosening sleeve 5 and as an extension of its upper end a spring-loaded loosening arm 6 sliding on the side of the body 1 (FIG. 2). This jet-container removal system in principle corresponds to that described e.g. in the publication FI-57540 (corresponds e.g. to the publication U.S. Pat. No. 4,151,750).

Outside the pipette body there is also a display 7, which indicates e.g. the volume set, and switches 8 by means of which e.g. the volume can be set.

The cylinder part 2 has a piston 9 reciprocating in the cylinder (FIG. 2). Its rotational movement relative to the cylinder is prevented by means of guides 10.

The piston 9 is moved by means of an electric motor 11. The motion of the motor is transmitted by means of a transmission mechanism formed from a coupling 12 and a gear-wheel system to a journalled guide screw 14. The coupling has a spring, which presses the gear wheel against an end flange of the shaft. In this way, the coupling slides at a certain boundary moment. At the upper end of the piston there is provided a guide nut 15 corresponding to the guide screw, and a space inside the piston such that the piston can move over the guide screw. When the guide screw is rotated, the piston thus moves either upwardly or downwardly depending on the rotational direction.

For example, an accumulator 16 acts as the power source for the motor.

The movement of the piston 9 is followed by a system 17, which has a rotating encoder disk 18 connected to the transmission system and a pair of sensors 19 counting its lines. By means of the system, it is possible to indicate both the location and the speed of the piston.

The press knob 3 is fitted to be slidable in a longitudinal slot 20 of the body 1. The knob is connected with a primary spring 21, which presses the knob into an upper position. The knob is further connected with a secondary spring 22, which presses the knob upwards after the knob is pressed beneath the lower position.

The knob is further connected with a primary coupling 23 and a secondary coupling 24 (FIG. 6–8), by means of which the functional step of the knob is identified.

Figure 3:
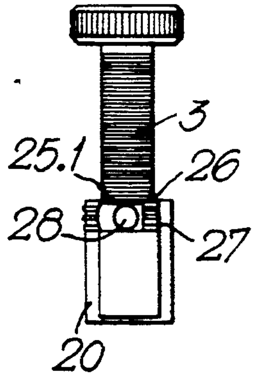
FIGS. 3 and 4 show knob-displacement measuring arrangements utilizable in the pipette.
Figure 4:
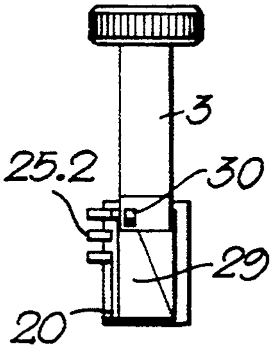

The displacement of the knob 3 is followed by means of a measurement system 25. FIGS. 3 and 4 show as examples different measurement methods.

The system 25.1 of FIG. 3 is based on a pulse sensor. It includes on the arm of the knob 3 encoder lines 26 and on the walls of the slot 20 fixed encoder lines 27. The lines 26 and 27 are read by means of an optic sensor 28.

The system 25.2 of FIG. 4 is based on a resistance sensor. It includes a fixed resistor 29 fixed to the slot 20 and a fork 30 sliding on a resistor fixed to the arm of the knob 3. The resistance measured by the system is comparable to the piston displacement. Such a system is more advantageous from the point of view of the current consumption than systems based on optic sensors. When so desired, a system based on an optic-analog sensor can also be used.

Figure 5:
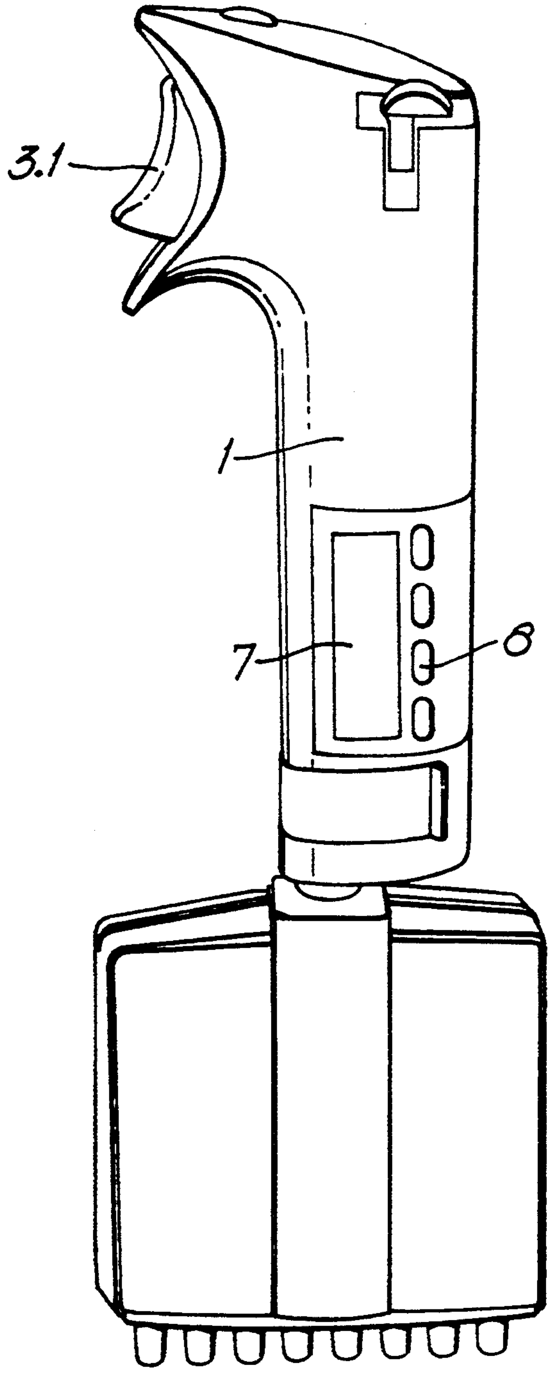
FIG. 5 shows an alternative positioning of the knob.

In the arrangement of FIGS. 1 and 2, the knob is positioned as an extension for the upper end of the body 1, to be used by the thumb in a similar manner than that utilized in pipettes operating by manual force. However, it may be ergonomically more preferable to use the solution of FIG. 5, wherein the knob 3.1 is positioned as projecting horizontally from the body 1 and as being used by the forefinger. FIG. 5 shows a multichannel pipette comprising eight cylinders. Otherwise the system corresponds to that of FIGS. 1 and 2.

Both the piston-movement monitoring system 17 and the press knob-displacement measuring system 25 are connected to an electronic control system 33 (FIG. 2).

The cylinder section 2 with its piston 9 may form a removable module. In this case, by changing the cylinder diameter, pipettes operating in different volume ranges can be obtained. The cylinder section has a code 34 indicating the volume range, e.g. a code formed from bulges or slots, and in the body a code reader 35, e.g. a reader formed from switches, connected correspondingly to the control system 33.

The code reader 35 can be based on the measurement of e.g. inductance, capacitance or resistance, too.

Figure 6:
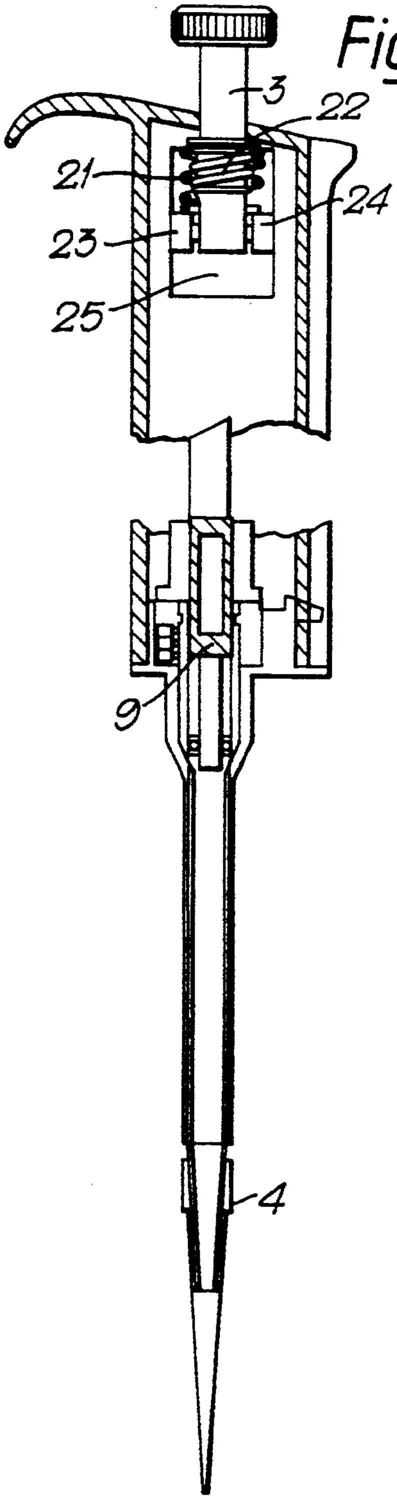
FIGS. 6, 7 and 8 show different steps of the use of the pipette.
Figure 7:
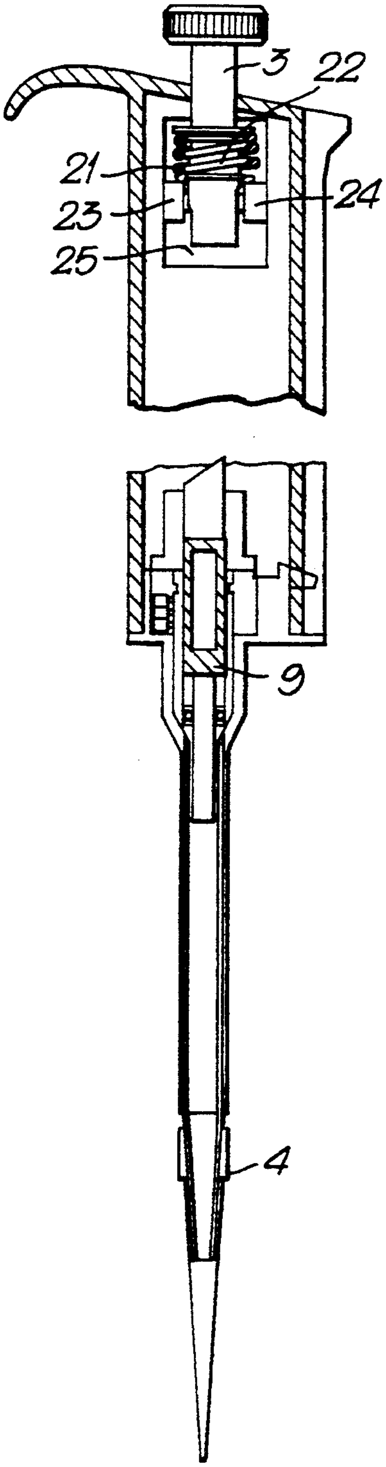
Figure 8:
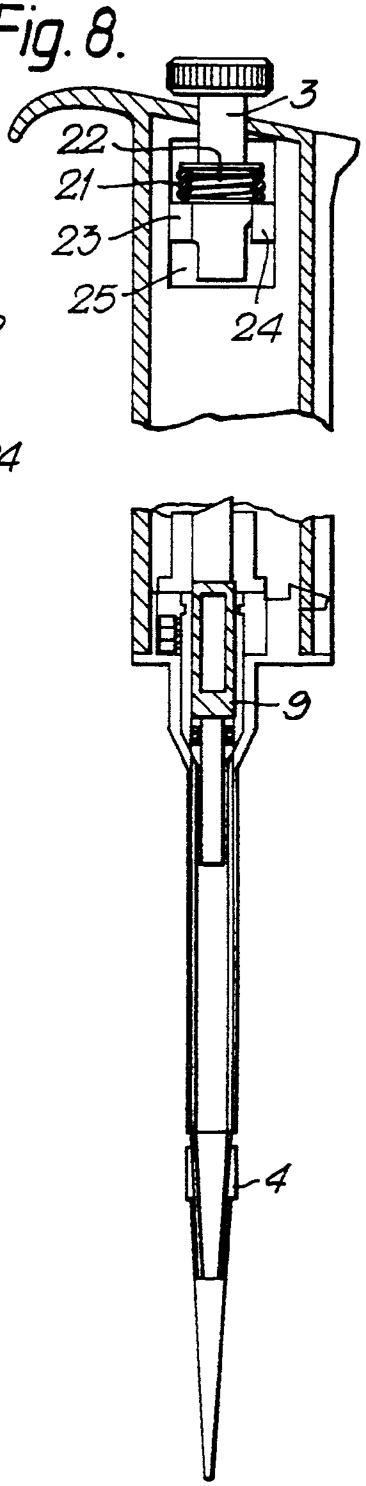

The operation of the pipette is illustrated by means of FIGS. 6–8. At the start of the pipetting (FIG. 1), the press knob 3 is in the upper position and the piston 9 in the upper position corresponding to the last pipetted volume. When necessary, the volume is reset, and the knob is pressed into the lower position against the force of the primary spring 21. As the knob starts descending, the measurement system 25 gives an information to the control system, by means of whose control the piston is driven to the lower position (FIG. 2). The jet container 4 of the pipette is now brought into the liquid and the knob is released into the upper position. The measurement system provides an information about the upward transfer of knob to the control system, and the piston is driven to an upper position corresponding to the set volume (FIG. 1). In this way, the desired volume of liquid is sucked into the container. When the liquid is dosed out, the knob is pressed past the lower position against the force of the secondary spring 22 into a discharge position. When the piston passes the lower position, the measurement system provides an information thereof to the control system, which correspondingly performs the driving of the piston into the discharge position. When the knob is released, the piston correspondingly returns into the upper position.

The pipette can be used in a stepping mode, too, whereby a sucked-in amount of liquid is dosed out as smaller doses. In this case, one pressing of the knob to the lower position moves the piston one step downwards.

Figure 9:
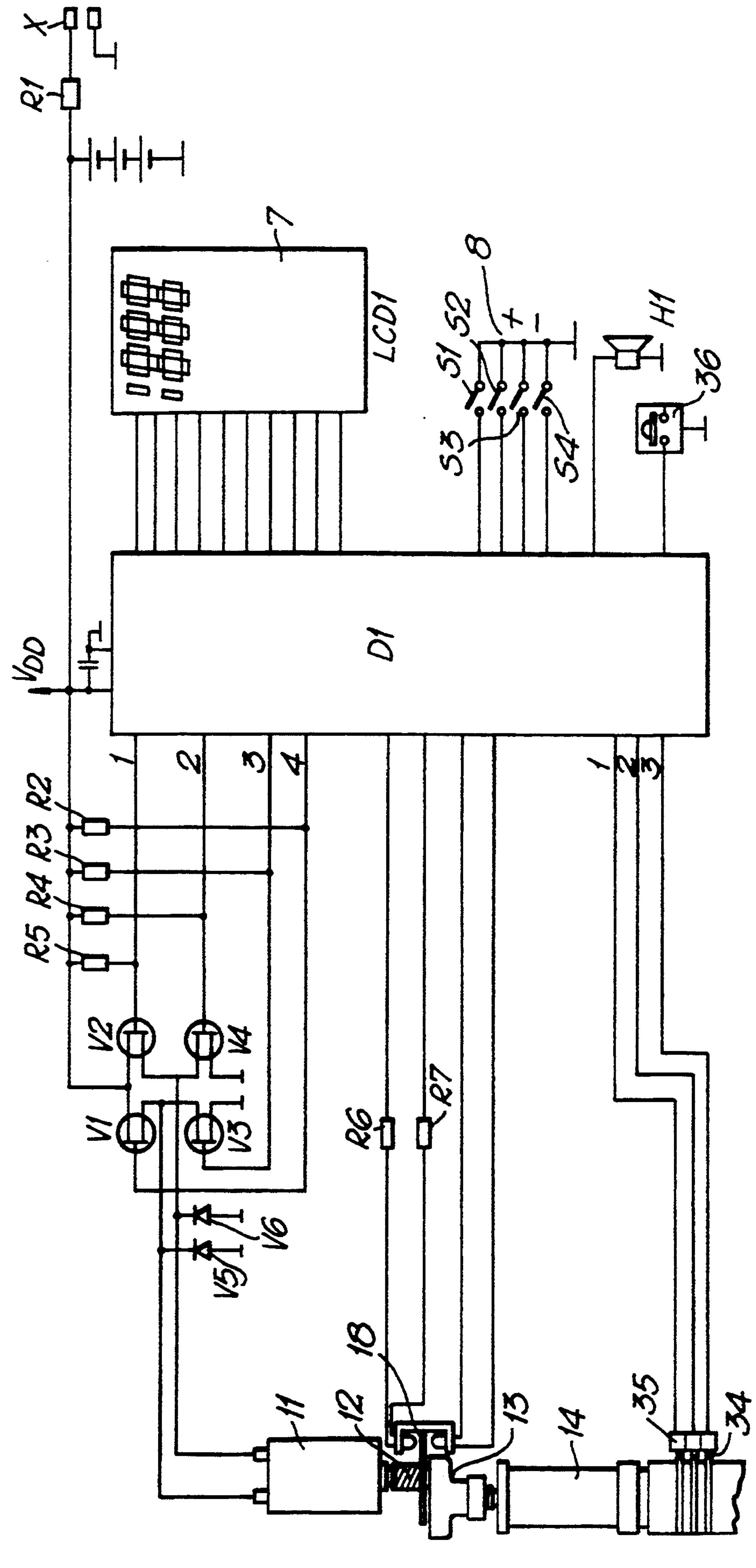
FIG. 9 shows the circuit diagram of the pipette.

The circuit diagram of the control system is shown in FIG. 9.

The programmed controller circuit D1 performs all the operations related to the interface (display 7, keyboard 8, code keys 35) of the pipette, to the runs of the motor 11 (pipetting, stepping) and to the charging of the accumulators 16.

The programs of the interface follow the commands to be given from the keyboard 8 and transmit the program execution according to them. In the running of the motor 11 is followed signals coming from the encoder 18, 19, from which signals the displacement of the piston is calculated. The volume to be dosed in the pipetting mode is comparative with the position of the operating switch. The dosing of the volume selected in the stepping operation is started up by means of a primary movement of the operating switch. The loading operation starts up, when a switching of the loading voltage is observed in the inlet of the controller D1.

The display LCD-1 and the keyboard S1 . . . S7 are directly connected to the corresponding controllers of the controller circuit D1. For the operation of the motor is arranged a separate bridge comprised of channel transistors V5 . . . V8, which bridge is controlled by the controller. As auxiliary functions related to the controller are a buzzer H1 activated by malfunctions and an indication of the operative voltage.

There is also an inertia switch 36 connected to the controller D1. This reacts to the movement of the pipette and activates the controller. Correspondingly, the controller is deactivated when the pipette has stayed unmoved e.g. for five minutes. This system acts as an automatic power on/off switch. It helps to save the batteries and also facilitates the use of the pipette.

We claim:

1. A knob pipette, which has a body and therein a lower end and an upper end, a cylinder open from below at the lower end of the body, and therein a piston movable between the lower and upper position for sucking liquid into the pipette and for removing it therefrom, wherein the improvement comprises

- a motor and a transmission mechanism related thereto for moving a piston;
- an electronic control system for controlling the movement of the piston;
- a stopping system for stopping the piston movement into a desired position;
- a knob reciprocatively and slidably movable in the body; and
- a knob-displacement measuring system connected to the control system such that the knob displacement produces a signal for the control system which in turn energizes the motor to move the piston, thereby controlling the piston movement by means of the control system.

2. A pipette according to claim 1, further comprising a piston-movement monitoring system in conjunction with the control system, which on the basis of information provided by the monitoring system gives a command to the stopping system to stop the piston movement.

3. A pipette according to claim 1, wherein the stopping system decelerates piston movement speed by means of the motor before the stopping of the piston movement.

4. A pipette according to claim 3, wherein the stopping system decelerates the piston speed to zero.

5. A pipette according to claim 1, wherein the knob is movable between a lower piston and an upper piston and the lower and upper position of the knob correspond to the lower and upper position of the piston.

6. A pipette according to claim 5, further comprising a spring mechanism for pressing the knob into the upper position.

7. A pipette according to claim 5, wherein the piston can be additionally moved beneath the lower position into a discharge position, and the knob can be correspondingly moved into a discharge position beneath the lower position.

8. A pipette according to claim 7, further comprising a spring mechanism which withstands the transfer of the knob pass the lower position towards the discharge position.

9. A pipette according to claim 5, wherein the body has a handle to be grasped by the palm, characterized in that the knob can be transferred towards the body and away therefrom.

10. A pipette according to claim 9, wherein the knob is transferred sideways to the body and sideways away therefrom.

11. A pipette according to claim 1, wherein one of the upper position and the lower position of the piston is adjustable.

12. A pipette according to claim 1, wherein a cylinder part of the cylinder is exchangeable.

13. A pipette according to claim 1, wherein the control system is connected to a sensor and the control system is automatically activated by a signal provided by the sensor.

14. A pipette according to claim 1, wherein the upper position of the piston is adjustable.

* * * * *